(12) United States Patent
Carnevale et al.

(10) Patent No.: US 6,353,910 B1
(45) Date of Patent: Mar. 5, 2002

(54) METHOD AND APPARATUS FOR IMPLEMENTING ERROR CORRECTION CODING (ECC) IN A DYNAMIC RANDOM ACCESS MEMORY UTILIZING VERTICAL ECC STORAGE

(75) Inventors: Michael Joseph Carnevale; Daniel Frank Moertl, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,336

(22) Filed: Apr. 9, 1999

(51) Int. Cl.7 .............................................. G11C 29/00
(52) U.S. Cl. ....................................... 714/763; 714/766
(58) Field of Search .......................... 712/207; 710/68; 395/704; 711/1, 770, 763, 766

(56) References Cited

U.S. PATENT DOCUMENTS

| | | | | |
|---|---|---|---|---|
| 5,386,521 A | * | 1/1995 | Saitoh | 712/207 |
| 5,666,560 A | * | 9/1997 | Moertl et al. | 710/68 |
| 5,950,003 A | * | 9/1999 | Kaneshiro et al. | 395/704 |
| 5,956,741 A | * | 9/1999 | Jones | 711/1 |
| 6,158,040 A | * | 12/2000 | Ho | 714/770 |

* cited by examiner

Primary Examiner—David Ton
(74) Attorney, Agent, or Firm—Joan Pennington

(57) ABSTRACT

Methods and apparatus for implementing error correction coding (ECC) in a dynamic random access memory (DRAM) utilizing vertical ECC storage. An integral number of available data blocks is identified for each page of the DRAM. Each data block includes a defined number of data and ECC bytes. Data and ECC bytes are stored in the identified integral number of data blocks for each page. The remaining bytes in each page are used as padding.

13 Claims, 3 Drawing Sheets

| BYTE 0 | DATA 0 |
|---|---|
| BYTE 1 | DATA 1 |
| BYTE 2 | DATA 2 |
| BYTE 3 | DATA 3 |
| BYTE 4 | ECC ON DATA 0-3 |
| * | * |
| * | * |
| BYTE 505 | DATA 404 |
| BYTE 506 | DATA 405 |
| BYTE 507 | DATA 406 |
| BYTE 508 | DATA 407 |
| BYTE 509 | ECC ON DATA 404-407 |
| BYTE 510 | NOT USED |
| BYTE 511 | NOT USED |

| BYTE 512 | DATA 408 |
|---|---|
| BYTE 513 | DATA 409 |
| BYTE 514 | DATA 410 |
| BYTE 515 | DATA 411 |
| BYTE 516 | ECC ON DATA 408-411 |
| * | * |
| * | * |
| BYTE 1017 | DATA 812 |
| BYTE 1018 | DATA 813 |
| BYTE 1019 | DATA 814 |
| BYTE 1020 | DATA 815 |
| BYTE 1021 | ECC ON DATA 812-815 |
| BYTE 1022 | NOT USED |
| BYTE 1023 | NOT USED |

FIG.3

| BYTE 0 | DATA 0 |
|---|---|
| BYTE 1 | DATA 1 |
| BYTE 2 | DATA 2 |
| BYTE 3 | DATA 3 |
| BYTE 4 | ECC ON DATA 0-3 |
| * * | * * |
| BYTE 505 | DATA 404 |
| BYTE 506 | DATA 405 |
| BYTE 507 | DATA 406 |
| BYTE 508 | DATA 407 |
| BYTE 509 | ECC ON DATA 404-407 |
| BYTE 510 | NOT USED |
| BYTE 511 | NOT USED |

| BYTE 512 | DATA 408 |
|---|---|
| BYTE 513 | DATA 409 |
| BYTE 514 | DATA 410 |
| BYTE 515 | DATA 411 |
| BYTE 516 | ECC ON DATA 408-411 |
| * * | * * |
| BYTE 1017 | DATA 812 |
| BYTE 1018 | DATA 813 |
| BYTE 1019 | DATA 814 |
| BYTE 1020 | DATA 815 |
| BYTE 1021 | ECC ON DATA 812-815 |
| BYTE 1022 | NOT USED |
| BYTE 1023 | NOT USED |

METHOD AND APPARATUS FOR IMPLEMENTING ERROR CORRECTION CODING (ECC) IN A DYNAMIC RANDOM ACCESS MEMORY UTILIZING VERTICAL ECC STORAGE

FIELD OF THE INVENTION

The present invention relates to an improved method and apparatus for implementing error correction coding (ECC) in a dynamic random access memory (DRAM) utilizing vertical ECC storage.

DESCRIPTION OF THE RELATED ART

When storing and reading error correction codes (ECC) that are vertically placed in a dynamic random access memory (DRAM), a basic performance problem arises when the ECC check bits are calculated over bytes that are contained in two DRAM rows. Read-Modify-Write (RMW) and Read-Close Row-Open Row-Read operations must be performed across DRAM row boundaries which degrade performance and increase design complexity.

For example, consider a DRAM based memory that is vertically storing ECC and designed to generate one byte of ECC for every four bytes of data. With a page size or one row of this memory is 512 bytes and one DRAM module in this memory which has a byte wide data bus, this means the hardware must make five accesses to the memory module to obtain the four bytes of data (one word) and the one ECC byte. Examining the very first page of this memory it is immediately apparent there are 102 five byte words in this page or 510 bytes with two bytes left over. The left over bytes resent a problem, two bytes of the 103rd word are in the first DRAM page and the next two bytes of data along with the ECC byte are in the next page of memory.

An ordinary read of these bytes at the row boundaries requires a read of two bytes from the first page, closing that page (row), and then opening and accessing the next page (row). This is very time consuming. Writes that are less than four bytes to this area are even worse. Such writes require a read of two bytes form the first page, closing that page, opening the second page to read the next two bytes of data and the ECC byte, closing the second page, merging in the new data to be written and calculating the new ECC byte. Then the first page is opened again to write two bytes. Then the first page is closed and finally the second page is opened again to write the remaining two byte along with the ECC byte. This is very time consuming and very complex.

SUMMARY OF THE INVENTION

A principal object of the present invention is to provide improved methods and apparatus for implementing error correction coding (ECC) in a dynamic random access memory (DRAM) utilizing vertical ECC storage. Other objects are to provide such methods and apparatus substantially without negative effects and that overcome many of the disadvantages of prior art arrangements.

In brief, methods and apparatus for implementing error correction coding (ECC) in a dynamic random access memory (DRAM) utilizing vertical ECC storage. An integral number of available data blocks is identified for each page of the DRAM. Each data block includes a defined number of data and ECC bytes. Data and ECC bytes are stored in the identified integral number of data blocks for each page. The remaining bytes in each page are used as padding.

In accordance with features of the invention, address translation is provided utilizing the equation:

$$Y = X + X/4 + \{2 \times \text{INT}((X+X/4)/510)\},$$

where X equals the logical address presented and Y equals the physical address and 510 represents 102 available data blocks for each page of the DRAM with each data block includes 5 bytes. A page number (P) can be calculated utilizing the following equation:

$$P = A/2^8 + A/2^{16} + A/2^{24} + A/2^{32} + A/2^{40} + A/2^{48} + A/2^{56} + A/2^{64} + A/2^{72} + A/2^{80} + A/2^{88} + \ldots,$$

where A equals $A = X + X/4$.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a block diagram illustrating a byte definition of pages 0 and 1 of the preferred embodiment;

DETAILED DESCRIPTION OF THE PREFERRED EMBODIMENTS

Figure 1:
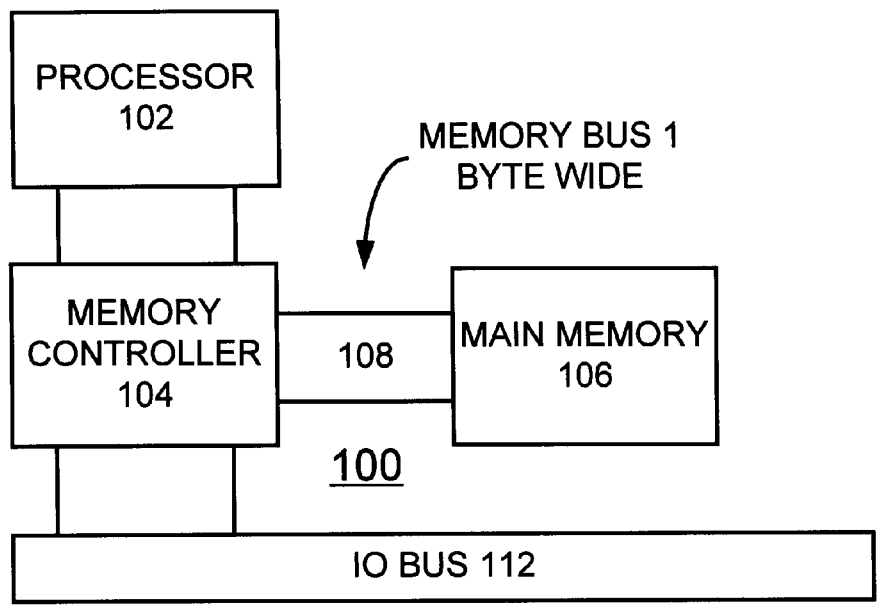
FIG. 1 is a schematic and block diagram illustrating a computer system of the preferred embodiment.

Referring now to FIG. 1, there is shown a memory system generally designated by reference character 100 for implementing error correction coding (ECC) in a dynamic random access memory (DRAM) utilizing vertical ECC storage of the preferred embodiment. System 100 includes a processor 102, a memory controller 104 coupled to a main memory 106 via a memory bus 108. An input/output (IO) bus 112 is connected to the memory controller 104. Main memory 106 is a DRAM based memory that is vertically storing ECC with one byte of ECC for every four bytes of data. A page is considered to be the number of bytes contained in one row of a DRAM module. DRAM modules have row and column address inputs. If a DRAM module had 9 column address inputs, the page size would be $2^9$ or 512 bytes. While the following description uses the page size (one row) of the memory 106 of 512 bytes, it should be understood that the present invention is not limited to a particular page size. As shown in FIG. 1, the DRAM module 106 has a byte wide data bus 108.

In accordance with features of the invention, an integral number of data blocks are stored in each DRAM page with partial block not used. Each data blocks includes a defined number of data and ECC bytes. For example, in the system 100, each data block or word includes four data bytes and one ECC byte. In accordance with the preferred embodiment, each page of the DRAM module 106 consists of 102 five byte words with the remaining two bytes defined as padding or not used. In conventional arrangements, these remaining two bytes store the first two bytes of a next word and the last two bytes of the data word along with the ECC byte are stored in the next page of memory. The present invention increases performance and decreases design complexity of the DRAM based memory 106 by throwing away the last two bytes of every 512 byte page, or 0.39% of the memory.

Figure 2:
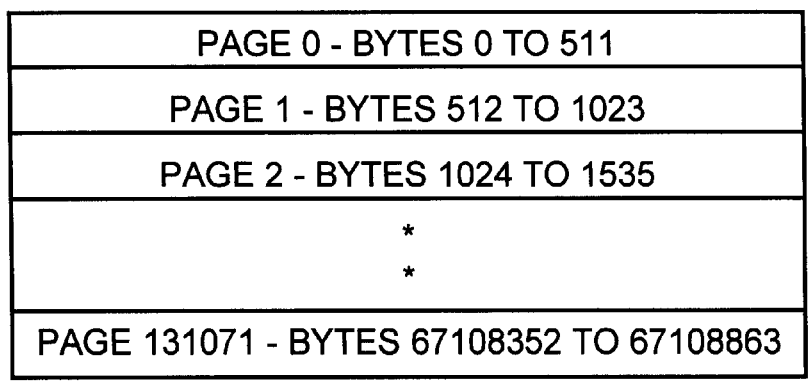
FIG. 2 is a block diagram illustrating a page definition of the preferred embodiment of a main memory of the system of FIG. 1.

Referring now to FIGS. 2 and 3, the page definition system generally designated by reference character 200 of the preferred embodiment of a DRAM based memory 106 is shown in FIG. 2. FIG. 3 illustrates a byte definition of pages 0 and 1 of the preferred embodiment. Each of the multiple pages 0–131071 in a 64 Mbyte main memory 106 respectively includes 512 bytes, as shown in FIG. 2.

As shown in FIG. 3, an ECC byte is provided for each four data bytes Note byte 505 stores data byte 404, resulting from inserting the ECC byte for each four data bytes. In page 0 including available bytes 0–511, bytes 510 and 511 are not used. In page 1 including available bytes 512–1023, bytes 1022 and 1023 are not used.

Figure 4:
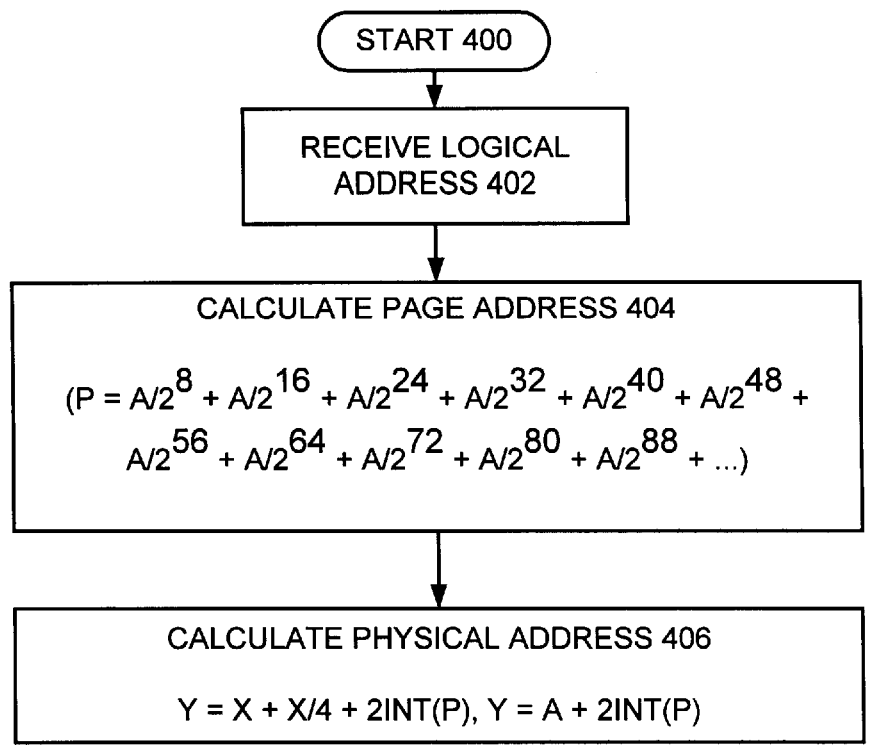
FIG. 4 is a flow chart illustrating logical steps performed by a memory controller of the system of FIG. 1 to identify a physical address of a logical address presented to the memory controller.

FIG. 4 illustrates logical steps performed by memory controller 104 to identify a physical address for a logical address presented to the memory controller starting at a block 400. A logical address is received as indicated at a block 402. Then a page address is calculated as indicated at a block 404. Then a physical address is calculated as indicated at a block 406.

The following equation can be used to determine the physical address (Y) in the DRAM module 106 based on the logical address (X) being presented to the memory controller 104 of system 100:

$$Y=X+X/4+\{2\times INT((X+X/4)/510)\}$$

For memory system 100 to be useful, the address translation to calculate the physical address Y is performed in less than a machine cycle. This is done by first calculating the page number (P) from the logical address (X) multiplied by 5/4 (X+X/4). For a 64 Mbyte memory this generates term A(25:0), 26 address lines that is divided by A(25:0) by 510 or divide A(25:1) by 255 as follows:

$$P=A/(2^8-1), A=2^8P-P, 2^8P=A+P, P=A/2^8+P/2^8$$

$$P=A/2^8+(A/2^8+P/2^8)/2^8=A/2^8+A/2^{16}+P/2^{16}$$

$$P=A/2^8+A/2^{16}+(A/2^8+A/2^{16}+p/2^{16})/2^{16}=A/2^8+A/2^{16}+A/2^{24}+A/2^{32}+p/2^{32}$$

So in general the page number (P) is equal to the infinite string of:

$$P=A/2^8+A/2^{16}+A/2^{24}+A/2^{32}+A/2^{40}+A/2^{48}+A/2^{56}+A/2^{64}+A/2^{72}+A/2^{80}+A/2^{88}+\ldots$$

Finding the page number P above can be implemented with hardware carry look ahead adders and incrementers, simple shifts of 8, 16, 24 and the like. It is important that the page number P is calculated with enough accuracy, simulations can be used to determine how many digits of accuracy to the right to binary point are necessary. Looking at the initial equation for Y above, P=(X+X/4)/510. To find the correct integer value of P a simple rule is followed: If the determined number of digits of accuracy to the right of the binary point are all 1's, the integer value of P is incremented by one. The physical address Y is now a simple shift of one of INT P to the left to multiply by 2 and then adding 5/4 X to this result. The physical address equals: Y=X+X/4+2INT(P),Y=A+2INT(P).

Enhanced performance results because ECC is always calculated across data that is a power of two, usually 4 or 8 bytes, this method of padding or throwing away the remaining bytes in a DRAM row eliminates row (page) crossings which are time consuming and complex to design. Another advantage is the simplified division method presented above. This method is useful because the logical address can be translated to the DRAM physical address in less than a machine cycle.

It should be understood that principles of the present invention are not limited to a particular page size of memory 106 or to a particular ECC technique. The present invention advantageously is used with various page and memory sizes, and various ECC techniques. For example, the present invention advantageously is used with a page size of 1024 bytes. With an ECC byte inserted for each eight data bytes and a page size of 1024 bytes, fewer bytes of the memory 106 are thrown away as compared to a page size of 512 bytes.

Figure 5:
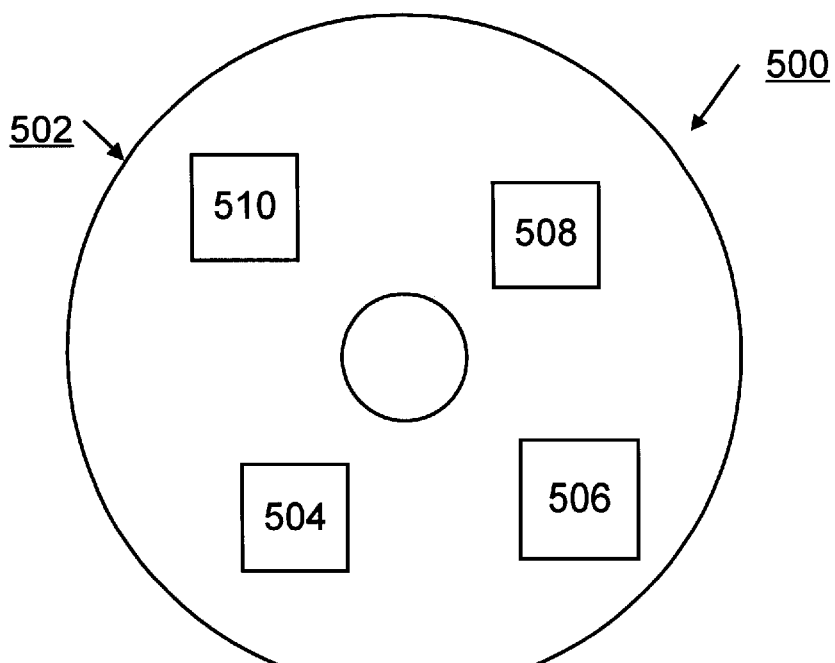
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 506, 504, 508, 510 on the medium 502 for carrying out the methods for implementing logical to physical address translation of the preferred embodiment in the system 100 of FIG. 1.

A sequence of program instructions or a logical assembly of one or more interrelated modules defined by the recorded program means 506, 504, 508, 510, direct the computer system 100 for implementing logical to physical address translation of the preferred embodiment.

While the present invention has been described with reference to the details of the embodiments of the invention shown in the drawing, these details are not intended to limit the scope of the invention as claimed in the appended claims.

What is claimed is:

1. A method for implementing error correction coding (ECC) in a dynamic random access memory (DRAM) utilizing vertical ECC storage comprising the steps of:
   identifying an integral number of data blocks available for each page of the DRAM;
   each of said data blocks including a defined number of data bytes and an ECC byte for said defined number of data bytes; said defined number of data bytes being a power of two;
   storing said defined number of data bytes and said ECC byte for said defined number of data bytes in each of said identified integral number of data blocks; and
   defining the remaining bytes of any partial data block in each page as not used.

2. The method for implementing error correction coding (ECC) in a dynamic random access memory (DRAM) utilizing vertical ECC storage as recited in claim 1 wherein the step of defining the remaining bytes of any partial data block in each said page as not used includes the step of identifying a partial data block and storing a next data block in a next sequential page in the DRAM.

3. The method for implementing error correction coding (ECC) in a dynamic random access memory (DRAM) utilizing vertical ECC storage as recited in claim 1 wherein each said data block includes a defined number of four data bytes and one ECC byte for said defined number of four data bytes and wherein each said page in the DRAM includes 512 bytes and wherein said step of identifying an integral number of available data blocks for each page of the DRAM includes the step of identifying said integral number of 102 data blocks available for each page of the DRAM.

4. The method for implementing error correction coding (ECC) in a dynamic random access memory (DRAM) utilizing vertical ECC storage as recited in claim 3 wherein said step of storing four data bytes and one ECC for said defined number of four data bytes in each of said identified integral number of data blocks includes the step of storing four data bytes and one ECC for said defined number of four data bytes in each of said 102 data blocks available for each page.

5. The method for implementing error correction coding (ECC) in a dynamic random access memory (DRAM) utilizing vertical ECC storage as recited in claim 3 wherein said step of defining the remaining bytes of any partial data block in each page as not used includes the steps of identifying a partial data block of two bytes and not using said identified two bytes for storing data or ECC bytes.

6. The method for implementing error correction coding (ECC) in a dynamic random access memory (DRAM) utilizing vertical ECC storage as recited in claim 1 wherein each said data block includes a defined number of eight data bytes and one ECC byte for said defined number of eight data bytes and wherein each said page in the DRAM includes 1024 bytes and wherein said step of identifying an integral number of available data blocks for each page of the DRAM includes the step of identifying said integral number of 113 data blocks available for each page of the DRAM.

7. The method for implementing error correction coding (ECC) in a dynamic random access memory (DRAM) utilizing vertical ECC storage as recited in claim 6 wherein said step of storing said defined number of data bytes and said ECC byte for said defined number of data bytes in each of said identified integral number of data blocks includes the step of storing eight data bytes and said one ECC for said defined number of eight data bytes in each of said 113 data blocks for each page.

8. The method for implementing error correction coding (ECC) in a dynamic random access memory (DRAM) utilizing vertical ECC storage as recited in claim 6 wherein said step of defining the remaining bytes of any partial data block in each page as not used includes the steps of identifying a partial data block of seven bytes and not using said identified seven bytes for storing data or ECC bytes.

9. The method for implementing error correction coding (ECC) in a dynamic random access memory (DRAM) utilizing vertical ECC storage as recited in claim 1 wherein the step of storing said defined number of data bytes and said ECC byte for said defined number of data bytes in each of said identified integral number of data blocks includes the step of receiving a logical address and calculating a physical address.

10. The method for implementing error correction coding (ECC) in a dynamic random access memory (DRAM) utilizing vertical ECC storage as recited in claim 9 wherein a page number (P) is calculated utilizing the following equation:

$$P=A/2^8+A/2^{16}+A/2^{24}+A/2^{32}+A/2^{40}+A/2^{48}+A/2^{56}+A/2^{64}+A/2^{72}+A/2^{80}+A/2^{88}+\ldots,$$

where A equals $A=X+X/4$ and X equals said logical address.

11. A computer program product for implementing error correction coding (ECC) in a dynamic random access memory (DRAM) utilizing vertical ECC storage, said computer program product including a plurality of computer executable instructions stored on a computer readable medium, wherein said instructions, when executed by a memory controller, cause the memory controller to perform the steps of:

receiving a logical address;

translating said logical address into a physical address by calculating a page number (P) represented by:

$$P=A/2^8+A/2^{16}+A/2^{24}+A/2^{32}+A/2^{40}+A/2^{48}+A/2^{56}+A/2^{64}+A/2^{72}+A/2^{80}+A/2^{88}+\ldots,$$

where A equals $A=X+X/4$ and X equals said logical address.

12. Apparatus for implementing error correction coding (ECC) in a dynamic random access memory (DRAM) utilizing vertical ECC storage, the dynamic random access memory (DRAM) including multiple pages, each page having a fixed size, said apparatus comprising:

a memory controller coupled to the dynamic random access memory (DRAM); said memory controller generating an ECC byte for a predefined number of data bytes; said predefined number of data bytes being a power of two;

said memory controller identifying an integral number of data blocks available for each fixed sized page of the DRAM; each said data block including said predefined number of data bytes and said ECC byte for said predefined number of data bytes; and said memory controller storing said integral number of data blocks in each said page and defining the remaining bytes of any partial data block in each said page as not used.

13. Apparatus for implementing error correction coding (ECC) in a dynamic random access memory (DRAM) utilizing vertical ECC storage as recited in claim 12 wherein said memory controller performs logical to physical address translation.

* * * * *